(12) United States Patent
Karakaya et al.

(10) Patent No.: US 9,197,760 B2
(45) Date of Patent: Nov. 24, 2015

(54) HAND ACTIVATED MODE SETTING

(71) Applicant: Lenovo (Singapore) Pte. Ltd., Singapore (SG)

(72) Inventors: Elif Karakaya, Raleigh, NC (US); Robert A. Bowser, Cary, NC (US); Scott Edwards Kelso, Cary, NC (US); Jian Li, Chapel Hill, NC (US); Bradley Park Strazisar, Cary, NC (US); Song Erin Wang, Cary, NC (US); Jianbang Zhang, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 24 days.

(21) Appl. No.: 13/735,648

(22) Filed: Jan. 7, 2013

(65) Prior Publication Data
US 2014/0194159 A1 Jul. 10, 2014

(51) Int. Cl.
*H04M 1/00* (2006.01)
*H04M 19/04* (2006.01)
*H04M 1/725* (2006.01)
*H04B 15/00* (2006.01)

(52) U.S. Cl.
CPC .......... *H04M 19/04* (2013.01); *H04M 1/72569* (2013.01); *H04M 2250/12* (2013.01)

(58) Field of Classification Search
USPC ....................... 455/456.4, 566, 567
See application file for complete search history.

(56) References Cited

U.S. PATENT DOCUMENTS

| | | | | |
|---|---|---|---|---|
| 8,614,627 | B2 * | 12/2013 | Orr | ............ 340/521 |
| 2012/0036433 | A1 * | 2/2012 | Zimmer et al. | ............ 715/702 |

* cited by examiner

*Primary Examiner* — Lee Nguyen
(74) *Attorney, Agent, or Firm* — Schwegman Lundberg & Woessner, P.A.

(57) ABSTRACT

A mobile networked device includes a processor, a control program stored on a computer readable medium, a sensor to detect whether the networked device is being held by a user, and wherein the control program receives signals from the sensor and places the device into an in-hand mode when the received signals are representative of the user holding the device.

19 Claims, 3 Drawing Sheets

HAND ACTIVATED MODE SETTING

BACKGROUND

When a mobile handheld device, such as a smart phone, notifies a user with a ring tone or vibration, the user retrieves the device to check it. Once the user checks the device, the device continues to provide notifications, even while the device is being held by the user and the user is able to see information pertaining to the notifications. A user may press a button or perform some other action responsive to the notification, such as answering a call, or may switch the device to silent mode or turn off the volume/vibration comprising the notification. The remaining visual aspects of the notification are sufficient to track an event giving rise to the notifications now that the user is holding and looking at the device. Noise or vibrations once the user is looking at the device may be undesirable as distracting to the user and others near the user.

SUMMARY

A mobile networked device including a processor, a display operatively coupled to the processor, a computer readable medium accessible by the processor and storing a control program, a sensor, operatively coupled to the processor, to detect whether the networked device is being held by a user, and wherein the control program receives signals from the sensor and places the device into an in-hand mode when the received signals are representative of the user holding the device.

A method includes receiving an event at a mobile device, providing a notification in accordance with a first mode, detecting when the device is being held by a user, switching the device to an in-hand mode, and discontinuing aural and tactile notifications when the device is switched to the in-hand mode.

In a further embodiment, a computer readable storage device includes executable code to cause a computer to perform the above method.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
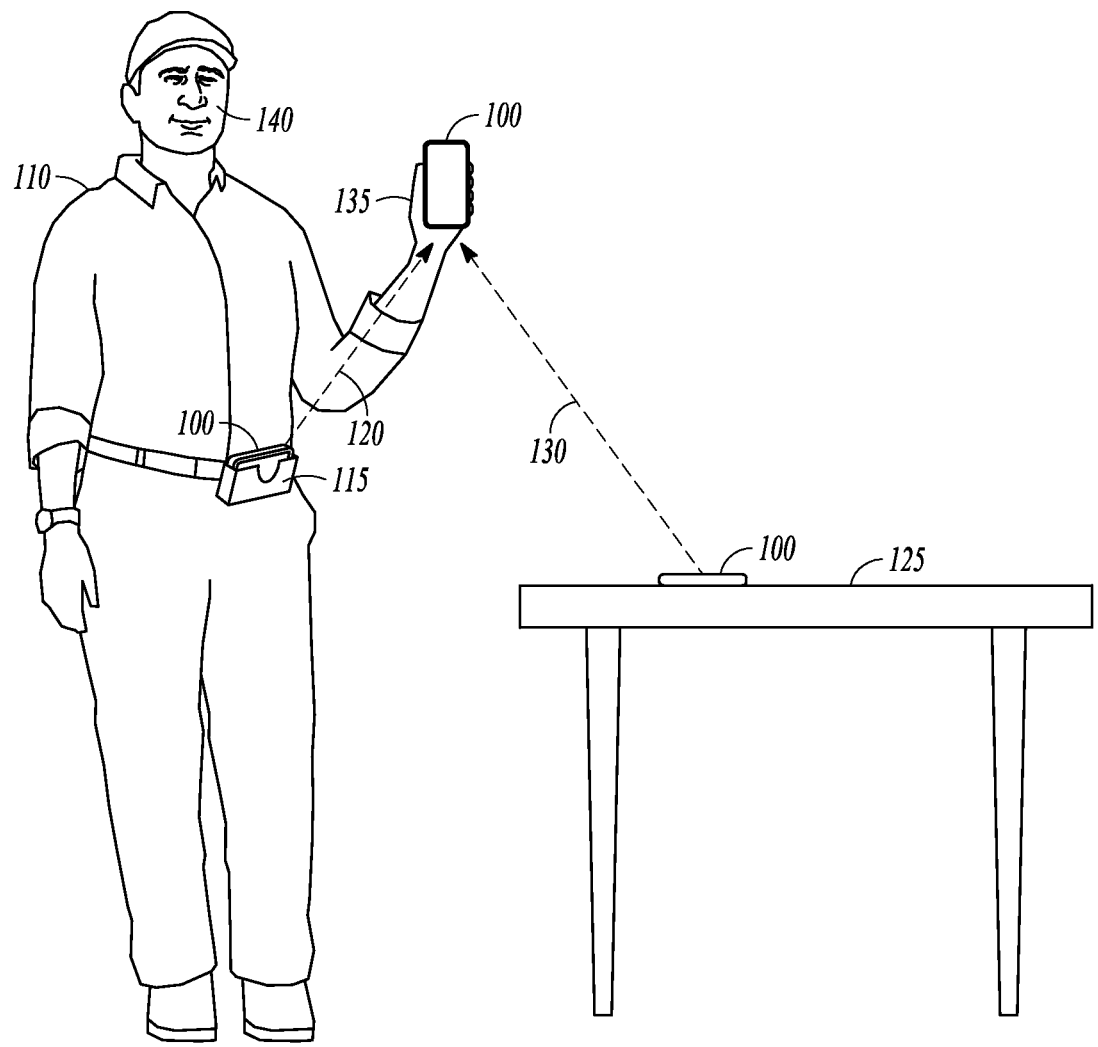
FIG. 1 is a diagram illustrating different positions for a networked device with respect to a user according to an example embodiment.

In various embodiments, a hand held device 100 is shown in multiple positions with respect to a user 110 in FIG. 1. The device 100 may be carried in a pocket or holster as indicated at 115 and picked up by a user as illustrated by broken arrow 120, or may be residing on a table 125 and picked up by a user as illustrated by broken arrow 130 when a notification is being played by the device 100. The user will usually pick up the phone with a hand 135, and bring the device closer to their face and eyes 140. The notification may be the result of an event, such as a received call, an alarm clock app, a timer app, or any other event which results in an audible or tactile indication provided by the device that is designed to alert the user to the event. The notification may be continuous until responded to, and may consist of repeated periods of sound generation and/or vibrations.

Figure 2:
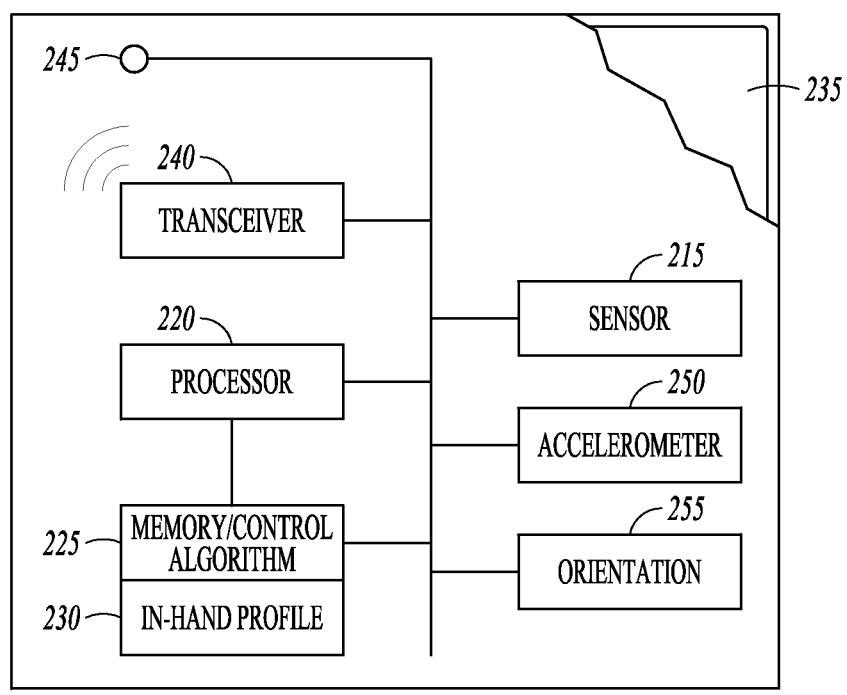
FIG. 2 is a block diagram of a networked mobile device according to an example embodiment.

FIG. 2 is a block diagram illustration of mobile device 100. Mobile device 100, such as a cell phone or smart phone detects a position of the device with respect to the user 110. The position of the device 100 may include whether the device 100 is being held or placed with respect to the user 110. In some embodiments, the device 100 detects whether the device 100 is being held in a user's pocket 115, or placed on a table 125 or other object utilizing one or more sensors 215. Based on the detected position, the device 100 is placed in a silent mode via a processor 220 that executes a control algorithm 225 to place the phone in a selected mode, such as an "in-hand" mode according to a profile 230, according to pre-selected user preferences for each position.

Profile 230 may contain many different profiles that may help conserve battery power. An in-hand profile may be used to save a user from having to retrieve and mute a device when notifications are received. In phones and other mobile handheld devices, there exist profiles/profile settings that the user can set according to the different environments the user may be in. Examples of common settings include a silent mode, vibrate mode, outdoor mode, etc.

In one embodiment, the device includes a touch sensitive screen 235 (a portion is illustrated) for displaying information and to receive tactile input, and also includes a transceiver 240 for voice and data communications utilizing one or more communication protocols over networks such as a commonly used by cellular devices.

In one embodiment, the device 100, control algorithm 225 provides the user an option to configure the device 100 by automatically muting it while the user is holding it "in-hand" and does not need to be notified via noise or vibration. The "in-hand" profile 230 may be activated by setting an "in-hand" flag to 1 once the user is detected to be holding the device 100. The detection may be achieved by making use of sensors 215 to sense a user's fingers touching around the device. Such sensors may include capacitive touch sensors, resistive touch pads, pressure sensors, spaced contacts utilizing hand conductivity, and temperature sensors positioned at multiple places on the device 100 as represented at 215, combined with feedback from a device front camera 245 indicating that the user 110 is facing the display. Facial recognition software may be used to detect the user's face in images provided by camera 245. In further embodiments, the image can be used to determine if the user is looking at the touchscreen 235 by analyzing the pupils of the user. By using such sensing, the device has information indicating whether it is being held in hand and being looked at or not. When the device is being held and looked at, the configurations are set for the "in-hand" profile to be activated, placing the device in an in-hand mode. The in-hand profile then causes the device to be muted depending on the "in-hand" profile settings. Similarly, once it is detected that the device has been released or not being looked at or put in some other place, the device may resume the default previous profile settings and enter a prior mode.

In further embodiments, the sensor information may be used to determine whether to respond to phone calls versus sending an automatic email, message, or other notification to the caller. In still further embodiments, the sensor information may be used to place the device into a snooze state, or to cancel an alarm when the device is being used as an alarm clock or timer.

As a result, a user may not have to go back and mute their device once the device is being actively used by the user and it is desired that the device be silent or in another predetermined mode from that moment on.

In one embodiment, the camera 245 is a thermal camera that includes a microbolometer or microbolometer array to detect infrared emissions within a field of view. Such infrared emissions may also be used to indicate if the device 100 has been retrieved and is being viewed by a user. Camera 245 may also function as a proximity sensor, detecting the distance from a person's head.

In further embodiments, an accelerometer 250 may be used to collect information regarding user interaction with the device. The accelerometer information may be correlated to whether the user is holding the device and using it versus the device remaining stationary on in a pocket or holster of the user. The information may also be correlated to the user retrieving the device to check a notification.

In still further embodiments, an orientation sensor 255, such as one commonly used to determine whether to display information in landscape or portrait mode is used to determine the orientation of the device. This information may also be useful in determining whether the device is likely to be being viewed by the user. The processor and control algorithm may fuse all the data received from various sensors to make such a determination, or may select one sensor to rely on for making the determination whether to place the device into an in-hand mode utilizing the in-hand profile. In further embodiments, data from any two or more sensors may be fused to make the determination.

Figure 3:
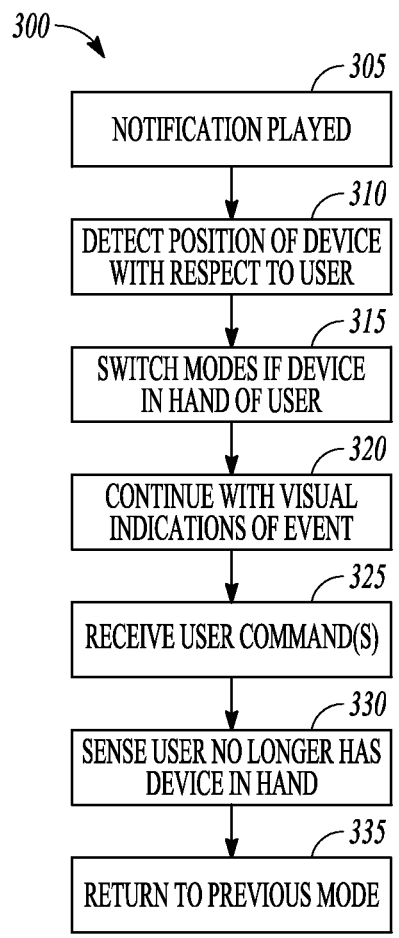
FIG. 3 is a flowchart illustrating a method executed by the device of FIG. 1 according to an example embodiment.

FIG. 3 is a flowchart illustrating a method 300 of activating a profile based on sensing whether a device is being held by a user. At 305, a call is received, resulting in a notification being played by the device in according with the mode currently selected for the device. This may result in the device playing a ring tone or vibrating or both in accordance with the current mode. At 310, sensors detect the position of the device with respect to the user. If the device is detected as being in hand, the device may switch modes at 315 such that the notification via sound and vibration stops, leaving only visual indications regarding the event that gave rise to the notification, which are provided at 320. At 325, the device may receive commands from the user, such as a command to respond to the event or answer a call if the event is a call. Other commands may also be entered as desired. At 330, the sensors may detect that the user has stopped holding the device. This may be the result of the user placing the device back on a table or in a pocket or holster. At this point, the device may return to the mode selected prior to the in hand mode at 335. In further embodiments, the user may select the mode to return to independent of the mode the device was in prior to the notification.

Currently, there are apps like G-Profile and Profile Scheduler that can automate a phone's sound profile settings to automatically change with a user's schedule. For instance, if a user has an appointment in the calendar, the application will automatically set the phone to vibrate. This is very useful when a user has a meeting, but not so useful if the user is using their calendar to remember other things. The profiles can also be activated by other events such as plugging in to an external power source, connecting a headset to the device, etc. However, there are currently no automated solutions for the event of grabbing and holding your mobile device and setting up/configuring an "in-hand" mode profile to avoid the annoying situation of a phone or mobile device continuing to ring while the user is studying visual indications on the mobile device.

EXAMPLES

1. A mobile networked device comprising:
a processor;
a control program stored on a computer readable medium;
a sensor to detect whether the networked device is being held by a user; and
wherein the control program receives signals from the sensor and places the device into an in-hand mode when the received signals are representative of the user holding the device.

2. The device of example 1 wherein the control program switches from a user selected mode that provides a notification when an event occurs to the in-hand mode when the user is detected as holding the device, and wherein the sensor senses rotation of the device representative of the device being held by the user.

3. The device of example 2 wherein the in-hand mode causes the device to provide visual indications of the event without a vibration or audible sound.

4. The device of any one of examples 1-3 wherein the sensor comprises a pressure sensitive sensor.

5. The device of any one of examples 1-4 wherein the sensor comprises a camera.

6. The device of example 5 and further comprises a display and entry touch screen on a front of the device, and wherein the camera is also on the front of the device.

7. The device of example 6 wherein the control program uses images from the camera to determine if the user is observing the device while a notification is occurring.

8. The device of any one of examples 1-7 wherein the control program receives signals from the sensor indicating the device is no longer being held and the control program returns the device to a mode different from the in-hand mode.

9. A method comprising:
receiving an event at a mobile device;
providing a notification in accordance with a first mode;
detecting when the device is being held by a user;
switching the device to an in-hand mode; and
discontinuing aural and tactile notifications when the device is switched to the in-hand mode.

10. The method of example 9 and further comprising:
detecting when the device is no longer being held by the user; and
placing the device in a non-in-hand mode upon such detection.

11. The method of example 10 wherein detecting the device is being held and no longer being held comprises sensing rotation of the device.

12. The method of any one of examples 9-11 wherein detecting the device is being held by the user utilizes a pressure sensor.

13. The method of example 9 wherein detecting the device is being held by the user utilizes a camera.

14. The method of example 13 wherein images from the camera are used to determine if the user is observing the device while the notification is occurring and wherein such images include infrared based images.

15. A computer readable storage device having instructions for causing a mobile networked device to perform a method, the method comprising:
receiving an event at a mobile device;
providing a notification in accordance with a first mode;
detecting when the device is being held by a user;
switching the device to an in-hand mode; and
discontinuing aural and tactile notifications when the device is switched to the in-hand mode.

16. The computer readable storage device of example 15 wherein the method further comprises:
detecting when the device is no longer being held by the user; and
placing the device in a non-in-hand mode upon such detection.

17. The computer readable storage device of any one of examples 15-16 wherein the in-hand mode causes the device to provide visual indications of the event without a vibration or audible sound.

18. The computer readable storage device of any one of examples 15-17 wherein detecting the device is being held and no longer being held comprises sensing rotation of the device.

19. The computer readable storage device of any one of examples 15-18 wherein detecting the device is being held by the user utilizes a camera.

20. The computer readable storage device of example 19 wherein images from the camera are to determine if the user is looking at the device based on the pupils of the user while the notification is occurring.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A mobile networked device comprising:
a processor;
a display on a front of the networked device and operatively coupled to the processor;
a non-transitory computer readable medium accessible by the processor and storing a control program;
a sensor, operatively coupled to the processor, to detect whether the networked device is being held by a user;
a camera on the front of the networked device to provide images of the user's face; and
wherein the processor, executing the control program receives signals from the sensor and camera and places the device into an in-hand mode in the case that the received sensor signals are representative of the user holding the device and the images indicate the user is looking at the display.

2. The device of claim 1 wherein the processor executing the control program switches from a user selected mode that provides a notification when an event occurs to the in-hand mode when the user is detected as holding the device, and wherein the sensor senses rotation of the device representative of the device being held by the user.

3. The device of claim 2 wherein the in-hand mode causes the device to provide visual indications of the event without a vibration or audible sound.

4. The device of claim 1 wherein the sensor comprises multiple sensors sensing multiple fingers of the user touching around the networked device.

5. The device of claim 1 wherein the display comprises an entry touch screen operatively coupled to the processor and located on a front of the device, and wherein the camera is also on the front of the device.

6. The device of claim 5 wherein the processor executing the control program uses images from the camera to determine if the user is observing the device while a notification is occurring.

7. The device of claim 1 wherein the processor executing the control program receives signals from the sensor indicating the device is no longer being held and the control program returns the device to a mode different from the in-hand mode.

8. A method comprising:
receiving an event at a mobile device;
providing a notification in accordance with a first mode;
detecting when the device is being held by a user;
detecting when the device is being looked at by the user;
switching the device to an in-hand mode when the device is being held and looked at; and
discontinuing aural and tactile notifications when the device is switched to the in-hand mode.

9. The method of claim 8 and further comprising:
detecting when the device is no longer being held by the user; and
placing the device in a non-in-hand mode upon such detection.

10. The method of claim 9 wherein detecting the device is being held and no longer being held comprises sensing rotation of the device.

11. The method of claim 8 wherein detecting the device is being held by the user utilizes multiple pressure sensors sensing multiple fingers of the user touching the device.

12. The method of claim 8 wherein detecting the device is being held by the user utilizes a camera on a front of the device to provide images of the user's face, including pupils.

13. The method of claim 12 wherein images from the camera are used to determine if the user is observing the device while the notification is occurring and wherein such images include infrared based images.

14. A computer readable storage device, that is not a transitory signal, having instructions for causing a mobile networked device to perform a method, the method comprising:
receiving an event at a mobile device;
providing a notification in accordance with a first mode;
detecting when the device is being held by a user;
detecting when the device is being looked at by the user;
switching the device to an in-hand mode when the device is being held and looked at; and
discontinuing aural and tactile notifications when the device is switched to the in-hand mode.

15. The computer readable storage device of claim 14 wherein the method further comprises:

detecting when the device is no longer being held by the user; and placing the device in a non-in-hand mode upon such detection.

16. The computer readable storage device of claim 14 wherein the in-hand mode causes the device to provide visual indications of the event without a vibration or audible sound.

17. The computer readable storage device of claim 14 wherein detecting the device is being held and no longer being held comprises sensing rotation of the device.

18. The computer readable storage device of claim 14 wherein detecting the device is being held by the user utilizes a camera on a front of the device to provide images of the user's face, including pupils.

19. The computer readable storage device of claim 18 wherein images from the camera are to determine if the user is looking at the device based on the pupils of the user while the notification is occurring.

\* \* \* \* \*